M. L. GREEN.
Hub-Attaching Device.
No. 211,990.   Patented Feb. 4, 1879.
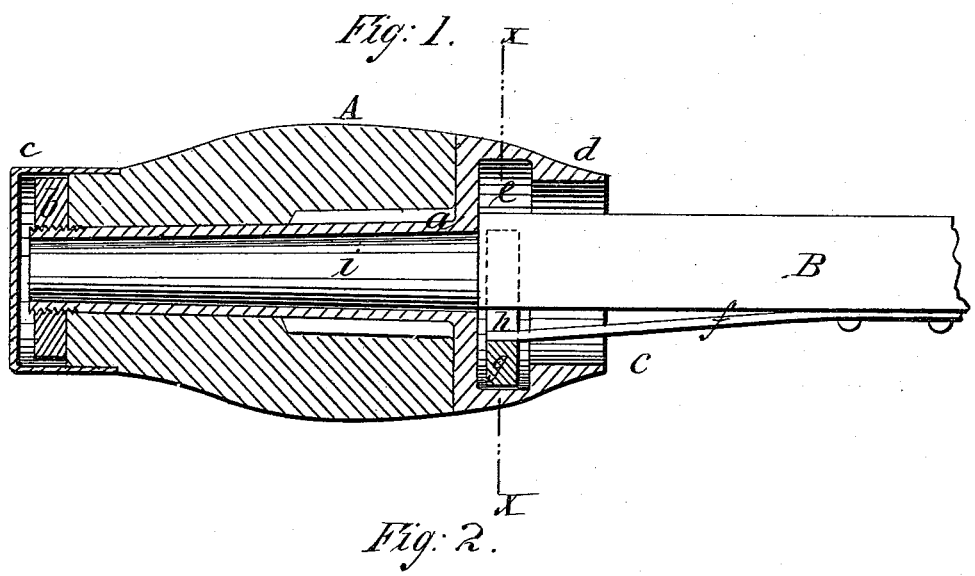
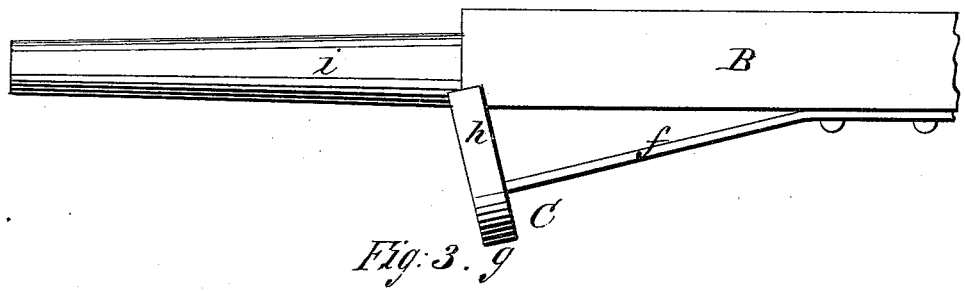
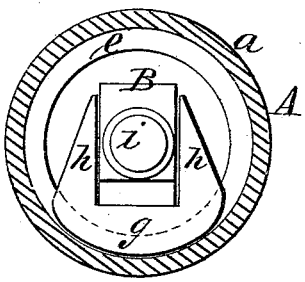
WITNESSES:
Achilles Schehl.
C. Sedgwick
INVENTOR:
M. L. Green
BY Munn & Co
ATTORNEYS.

UNITED STATES PATENT OFFICE.

MORRIS L. GREEN, OF LONDONDERRY, OHIO.

IMPROVEMENT IN HUB-ATTACHING DEVICES.

Specification forming part of Letters Patent No. 211,990, dated February 4, 1879; application filed November 19, 1878.

*To all whom it may concern:*

Be it known that I, MORRIS L. GREEN, of Londonderry, in the county of Guernsey and State of Ohio, have invented a new and Improved Wheel-Hub and Axle, of which the following is a specification:

The invention will first be described in connection with the drawings, and then pointed out in the claim.

In the accompanying drawings, Figure 1 is a longitudinal section of my improved hub connected to the axle. Fig. 2 is an elevation of the axle separately. Fig. 3 is a cross-section on line $x\,x$ of Fig. 1.

Similar letters of reference indicate corresponding parts.

The hub A is to be of any desired character and adapted to receive the spokes of the wheel. $a$ is the metal box of the hub, retained in place by a nut, $b$, at the outer end. $c$ is the point-cap of the hub. At the inner end the box $a$ extends beyond the hub, forming a prolongation of the hub and a dust-cap, $d$. $e$ is an annular groove or recess formed at the inner side of box $a$.

The axle or spindle B is of usual construction, except that its journal $i$ has no thread at the outer end. C is the spring-hook, which I prefer to make as a flat spring-tongue, $f$, connected rigidly to the axle, and with its free end provided with a hook, $g$, and with lugs or forks $h\,h$, that pass at each side of the axle and retain the spring in position laterally. This construction also increases the bearing-surface of the hook.

When the hub is upon the axle the hook $g$ is within the groove $e$, the tongue $f$ retaining it in place, so that the wheel and axle are retained together by the shoulder of the recess $e$.

I prefer to attach the hook $c$ at the under side of axle B, so that when a jack is placed under the axle to raise the wheel it will press up tongue $f$, and the wheel can then be drawn off the hook end $g$, passing freely through dust-cap $d$.

The recess $e$ also constitutes a chamber that retains any grease that escapes from the journal, and prevents it from getting upon the outside of the hub.

The connection of the hub to the axle by the described arrangement is firm and reliable, as well as simple, and there are no parts to be detached in taking off the wheel.

If desired, a movable stop may be placed upon the axle, to prevent any inward movement of the hook when in place; but with a strong spring such a device would not be required.

I am aware that it is not new to hold the hub of a wheel to its axle by means of a spring-catch or a pivoted hook-lever, either of said devices being secured to the axle; but

What I claim as new and of my invention is—

The flat spring $f$, arranged on the bottom of the axle between the prongs of a bifurcated head, $g\,h$, the part $g$ serving as a hook or catch to work in a groove, $e$, of journal-box, and the arms $h\,h$ embracing the angular portion of axle, as shown and described.

MORRIS L. GREEN.

Witnesses:
JOHN HOLLAND GREEN,
JOHN T. DAVIDSON.